May 20, 1941.　　　W. R. FREEMAN　　　2,242,297
RATIO CHANGING MEANS FOR FLUID-ACTUATED BRAKES
Filed Sept. 2, 1939　　　2 Sheets-Sheet 1
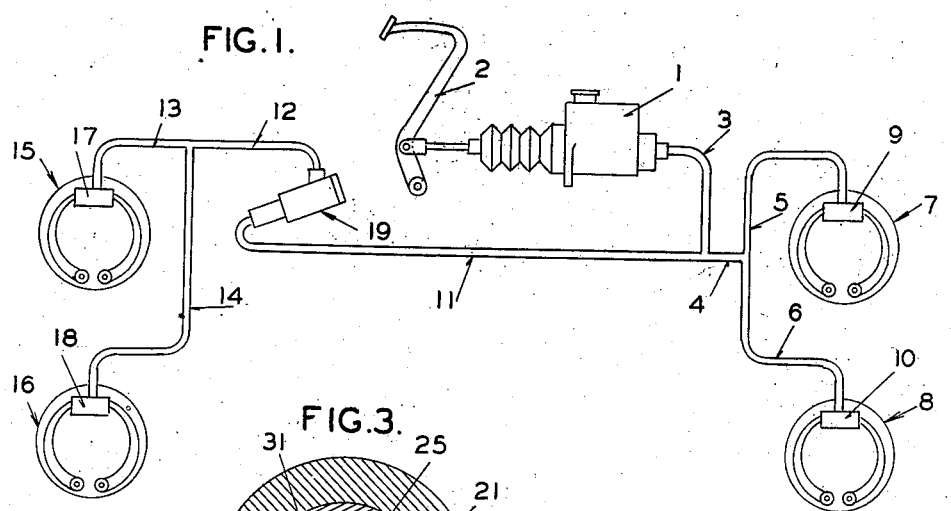
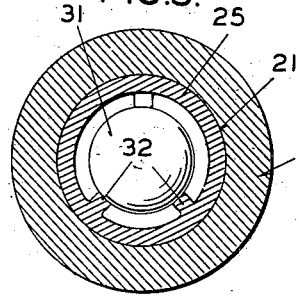
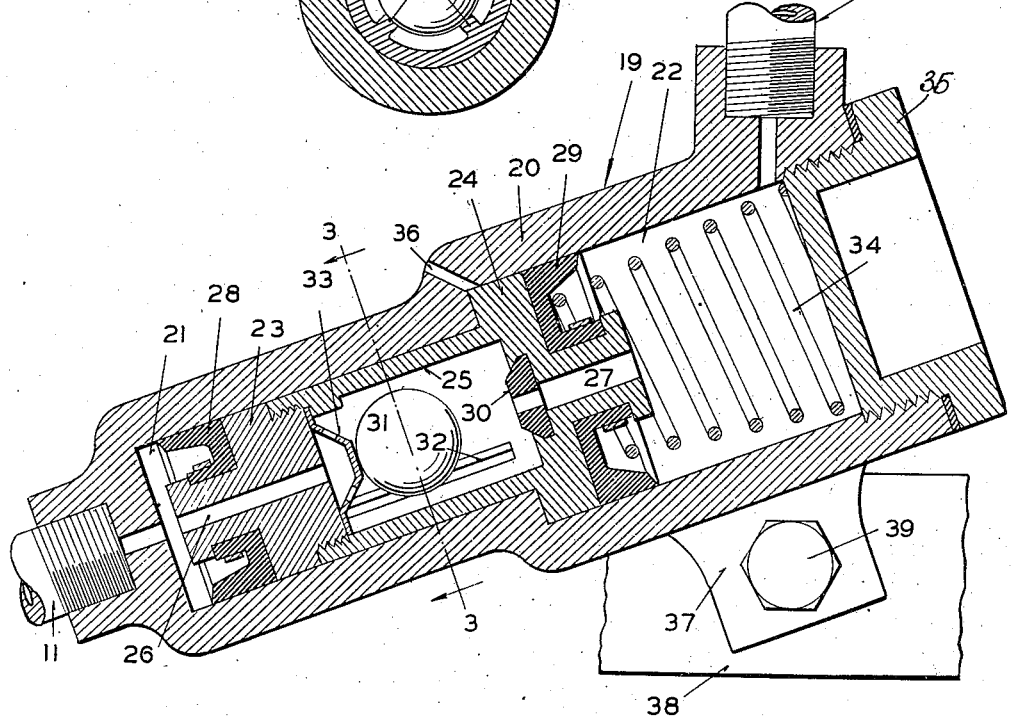
INVENTOR
W. R. FREEMAN
BY
*E. E. Huffman*
ATTORNEY

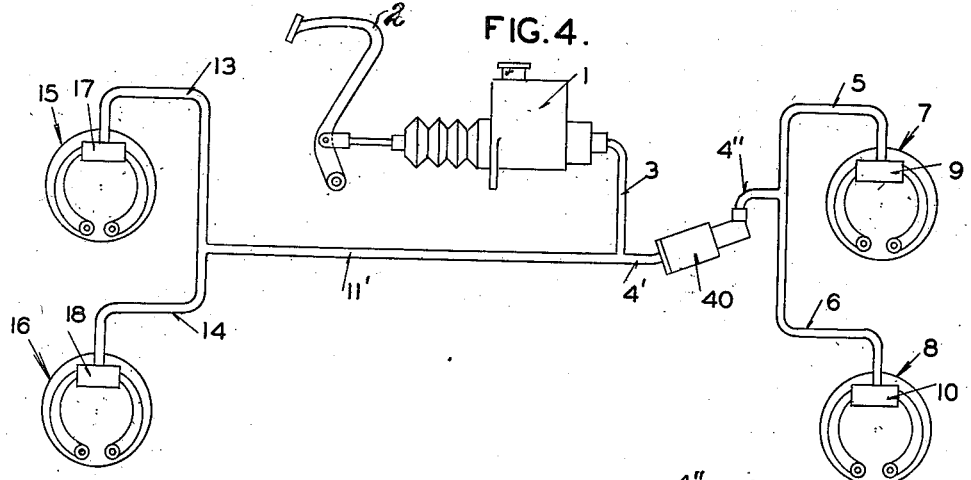
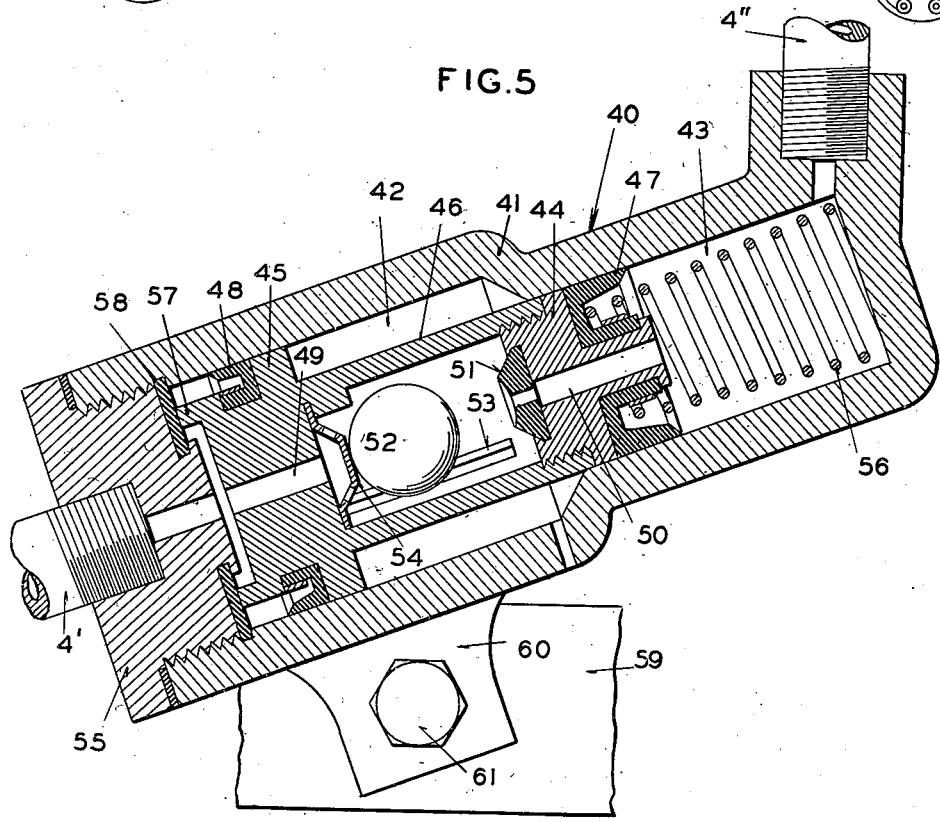

Patented May 20, 1941

2,242,297

UNITED STATES PATENT OFFICE 2,242,297

RATIO CHANGING MEANS FOR FLUID-ACTUATED BRAKES

Walter R. Freeman, University City, Mo., assignor to Wagner Electric Corporation, St. Louis, Mo., a corporation of Delaware Application September 2, 1939, Serial No. 293,176

17 Claims. (Cl. 188—152)

My invention relates to braking apparatus and more particularly to automatically operable means for changing the ratio of the pressures being applied to different brakes.

One of the objects of my invention is to provide automatically operable means in a vehicle brake actuating system for changing the ratio of the pressures being applied to different brakes when the vehicle has a predetermined rate of deceleration.

Another object of my invention is to provide a hydraulic brake actuating system with inertia-controlled means for automatically causing the ratio between the fluid pressure acting to operate two different sets of brakes to be changed when fluid under pressure is supplied from the source and the vehicle is decelerating at a predetermined rate.

Other objects of my invention will become apparent from the following description taken in connection with the accompanying drawings in which Figure 1 is a diagrammatic view of a fluid braking system having associated therewith a ratio changing device embodying my invention; Figure 2 is a cross-sectional view showing details of the ratio changing device; Figure 3 is a cross-sectional view taken on the line 3—3 of Figure 2; Figure 4 is a diagrammatic view of a fluid braking system having associated therewith another form of ratio changing device; and Figure 5 is a cross-sectional view of details of the device shown in Figure 4.

Referring to Figure 1, the hydraulic braking system disclosed comprises a source of pressure in the form of a master cylinder 1 which is actuated by a brake pedal 2. The outlet of the master cylinder is connected to a conduit 3 communicating with conduits 4, 5, and 6 leading to the front wheel brake assemblies 7 and 8, the brake shoes of which are actuated by fluid motors 9 and 10, respectively. The conduit 3 also communicates with conduits 11, 12, 13 and 14 leading to the rear brake assemblies 15 and 16, the brake shoes of which are actuated by fluid motors 17 and 18.

In accordance with my invention, I interpose between the conduits 11 and 12 leading to the fluid motors of the rear brakes an inertia-operated ratio changing device 19 whereby the fluid pressure being applied by the master cylinder to the fluid motors 17 and 18 may be caused to be different than the fluid pressure being applied by the master cylinder to the fluid motors 9 and 10 of the front wheel brakes whenever the rate of deceleration of the vehicle upon which the braking system is mounted becomes a predetermined value.

The ratio changing device 19 is shown in detail in Figure 2 and comprises a casing 20 having inter-communicating bores 21 and 22, the latter being of larger diameter than the former. Within the bore 21 is a piston 23 and within the bore 22 is a piston 24 connected to the piston 23 by a cylindrical portion 25 having threaded engagement with the said piston 23. The smaller piston is provided with a passage 26 and the larger piston is provided with a passage 27, said passages in cooperation with the cylindrical extension 25 providing communication through the interconnected pistons from the bore 21 to the bore 22 whereby fluid may flow from the conduit 11 connected to the outer end of the small bore to the conduit 12 connected to the outer end of the large bore. The piston 23 carries a packing cup 28 and the piston 24 carries a packing cup 29 to prevent leakage of fluid between the pistons and the walls of the bore.

The inner end of passage 27 in the large piston 24 has associated therewith an annular valve element 30 made of rubber or like material for cooperation with a ball 31 which is positioned on ribs 32 formed on the inner surface of the cylindrical connecting portion 25, thereby providing a track upon which the ball can roll. A perforated baffle member 33 is associated with the inner end of the passage 26 so as to prevent the ball from closing the passage and to also prevent the fluid which passes through the passage 26 from impinging upon the ball. The pistons are biased to an extreme end position in their bores by a spring 34 positioned between the large piston 24 and a closure plug 35 for the outer end of the larger bore. There is also provided a passage 36 in the casing 20 at the juncture of the two bores to permit free interchange of air as the pistons are moved. The casing 20 carries a mounting lug 37 whereby the device may be secured to a suitable support 38 by means of a bolt 39.

In operation, the casing of the inertia-controlled ratio changing device is so mounted on the vehicle that the large bore will be positioned toward the forward end of the vehicle and the axes of the bores and the track will be longitudinal with the vehicle and inclined at an angle to the horizontal when the vehicle is on a level roadway. Under these conditions, the ball 31 will be acted upon by gravity and be in the position shown in Figure 2 where it is disengaged from valve element 30. As long as the ball remains in this position, fluid under pressure is free to flow from the conduit 11 to the conduit 12 when the usual piston (not shown) of the master cylinder is operated to apply the brakes and in the reverse direction when the piston of the master cylinder is retracted to release the brakes. As long as the ball remains in the position shown in Figure 2, the pressure of the fluid in all the fluid motors of the brakes will be the same.

This condition will prevail as long as the rate of deceleration is insufficient to cause the action of inertia to move the ball up the inclined track to a position where it will engage the valve element 30. When this rate of deceleration is reached by the application of the braking pressure to all the wheels of the vehicle, communication between the conduits 11 and 12 leading to the fluid motors of the rear brakes will be cut off and the fluid pressure created by the master cylinder will act on the small piston 23 and by means of the connection 25 on the large piston 24 to apply pressure to the fluid in the large bore and the column connected to the fluid motors 17 and 18. Since the piston 24 is of larger diameter than the piston 23, the pressure of the fluid acted upon by the large piston will increase at a lower rate than the pressure of the fluid created by the master cylinder and acting upon the smaller piston 23. Thus it is seen that there will be a change of ratio between the fluid pressure created by the master cylinder and the fluid pressure acting on the fluid motors 17 and 18 of the rear brakes. The fluid pressure effective in the fluid motors of the front wheel brakes will be the same as that created by the master cylinder and also that acting on the small piston 23. Therefore, when the rate of deceleration of the vehicle reaches the predetermined value where the ball becomes seated (this predetermined value being determined by the inclination of the track which will vary with the roadway surface, there will be a change in ratio between the pressure acting on the motors of the front wheel brakes and the pressure acting on the motors of the rear wheel brakes, the latter being the smaller in the particular arrangement shown. After the change-over takes place the ratio between the pressures will remain constant if the friction of the cups, etc., is disregarded.

The wall 31 will remain seated as long as the fluid pressure acting on the piston 23 is greater than the fluid pressure acting on piston 24. When it is desired to release the brakes, the piston of the master cylinder is released in the usual manner, thereby releasing the fluid pressure acting on piston 23. The fluid pressure acting to hold the ball seated will now be released and it will be forced off the seat by the higher fluid pressure in the bore 24. The rate of deceleration when the brakes are released will immediately be such that action of gravity will cause the ball 31 to roll to its inoperative position shown in Figure 2. The spring 34 insures that the interconnecting pistons will be moved to their normal inoperative position also shown in Figure 2.

The ratio changing device is very useful to properly proportion the braking between the front and rear wheels as the load of the vehicle shifts forwardly when the brakes are applied. When the brakes are initially applied, it is desirable to have both the front wheel and rear wheel brakes applied with substantially uniform pressure. As the rate of deceleration of the vehicle increases due to increased braking action, the load of the vehicle will shift forwardly, thereby increasing the pressure between the front wheel tires and the roadway and decreasing the pressure between the rear wheel tires and the roadway. If the pressure being applied to the front and rear wheel brakes is the same under these conditions, then the maximum pressure cannot be applied to the front wheel brakes because if such were done too much pressure would be applied to the rear wheel brakes and these wheels would skid due to the decreased pressure contact between the tires and the roadway. By employing the inertia-operated ratio changing device in the braking system, the ratio between the pressure acting on the motors of the front wheel brakes and that on the motors of the rear wheel brakes is changed and a higher braking force is applied to the front wheel brakes than to the rear wheel brakes. This change in ratio takes place at the proper time and can be regulated as desired by varying the angle at which the track for the ball is positioned to the horizontal when the vehicle is on a level roadway.

The device also permits better braking action during bad weather when the roadway is wet, muddy or icy. Due to the decreased friction between the wheels and the roadway, the rate of deceleration of the vehicle will be less than it would be if the road were dry. If the angle of the track is such that the rate of deceleration does not become great enough to cause the ball 31 to engage the valve element, the brakes will be applied with the same fluid pressure in all the fluid motors during the braking period and the change of ratio will not take place. Thus, without the greater breaking force on the front wheel brakes, there will be less possibility of front wheel skids and loss of control of the vehicle.

In the braking system shown in Figure 1 wherein the inertia device is associated with the conduits leading to the fluid motors of the rear brakes, the arrangement is such that the fluid pressure acting on the fluid motors of the rear wheel brakes is less than that acting on the front wheel brakes and also the pressure developed by the master cylinder. In the braking system shown in Figure 4, there is provided an inertia-operated ratio changing device which can be incorporated in the conduits leading to the front wheel brakes whereby substantially the same results can be obtained as by the braking system shown in Figure 1. In the system of Figure 4, however, the fluid pressure effective in the fluid motors of the rear wheel brakes is the same as that developed by the master cylinder and fluid pressure effective in the fluid motors of the front wheel brakes is greater than that developed by the fluid motor whenever the ratio changing device is effective.

As shown in Figure 4, the master cylinder 1 is actuated by the brake pedal 2 connected by the conduit 3 and conduit 4' and 4", 5 and 6 to the front brake assemblies 7 and 8, the shoes of which are actuated by the fluid motors 9 and 10 in the same manner as illustrated in Figure 1. The conduit 3 also communicates with conduits 11', 13 and 14 leading to the rear brake assemblies 15 and 16, the shoes of which are actuated by the fluid motors 17 and 18. Interposed between the conduits 4' and 4" is an inertia-controlled ratio changing device 40 which is similar to the one previously described but has its pistons interchanged so that the large piston will be acted upon by the fluid pressure created by the master cylinder and the smaller piston will act on the fluid column connected to the fluid motors of the front wheel brakes.

As shown in detail in Figure 5, the device comprises a casing 41 provided with a large bore 42 and a small bore 43. Within the small bore is a piston 44 connected to the piston 45 in the large bore by a cylindrical portion 46 carried by the large piston. The small piston is provided with a packing cup 47 and the large piston with a packing cup 48. In the large piston is a passage 49 and extending through the small piston is a passage 50 which with the cylindrical connecting portion 46 provides communication through the piston. The inner end of the passage 50 is provided with an annular rubber valve element 51 for cooperation with the rolling ball 52 positioned in the cylindrical portion 46 and mounted on ribs 53. A perforated baffle 54 holds the ball away from passage 49 and also prevents fluid from impinging on the wall. The large bore is closed by a plug 55 and connected to the conduit 4' leading from the master cylinder and the small bore is connected to the conduit 4" leading to the fluid motors of the front wheel brakes. The pistons are biased to the ends of their bores by a spring 56 interposed between the small piston and the end of the small bore. In order that the normal inoperative positions of the pistons may not be disturbed by unbalanced forces acting on the pistons of different sizes, the large piston 45 is provided with an annular rib 57 which is held by spring 56 in engagement with a disc 58 of rubber or like material covering the inner surface of plug 55. The area of the surface of the head of piston 15 within the rib 57 is equal to the area of the head of the small piston 44. Thus with equal fluid pressures acting on the areas, there is no force tending to move the pistons.

In operation, the casing is mounted on a support 59 by the mounting lug 60 and bolt 61 so that the position of the casing is such that the small bore will be forward of the rear bore and above the rear bore, and the axes of the bores will be at an angle to the horizontal when the vehicle is on a level roadway. The angle of inclination determines the rate of deceleration necessary to cause the action of inertia to roll the ball up the track and engage it with the valve element 51. When this occurs, the fluid motors of the front wheel brakes will be cut off from the master cylinder and the fluid pressure developed by the master cylinder will be effective to move the pistons and cause the area of the large piston to be exposed to the fluid pressure being created by the master cylinder. The large piston will now apply pressure to the fluid in the small bore by means of the small piston and since the piston 44 is of smaller diameter than the piston 45, a greater fluid pressure will be created in the small bore and the column of fluid connected to the front wheel fluid motors than is present in the large bore. It is thus seen that when the change-over takes place, the front wheel brakes will, thereafter be applied with a greater force than the rear wheel brakes. The fluid pressure in the fluid motors of the rear brakes, however, will be determined by the fluid pressure developed by the master cylinder and the fluid pressure in the fluid motors of the front wheel brakes will be determined by the diameter of the small piston.

When the brakes are released, the ball 52 will be disengaged from the valve element by the greater fluid pressure in the small bore 43 and the pistons will return by the spring 56 to their inoperative positions as shown in Figure 4. In order that the ball may be retained seated when it is moved by the action of inertia to a position to engage the valve element 51, the seat of this valve element is shown as concave to conform with the surface of the ball. This will cause the fluid in the cylinder portion 46 to act upon a greater area of the ball to hold it seated against the greater fluid pressure in the passage 50 acting upon the area of the ball determined by the area of the opening through the valve element.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In fluid pressure braking apparatus for a vehicle, a plurality of brakes, means for actuating the brakes comprising a source of pressure, a fluid motor associated with each brake and conduit means for connecting said motors to the source of pressure to permit fluid under uniform pressure to be supplied to the motors, and means associated with the conduit means leading to the fluid motor of one brake and operable automatically in response to deceleration of the vehicle for causing the fluid pressure being increasingly applied by the source to said motor to increase at a different rate than the fluid pressure applied by said source to another motor of the brakes and the fluid pressure in the said fluid motor of the one brake to be different than the fluid pressure in said other fluid motor of the brakes for each value of fluid pressure applied regardless of the period of time said pressure is being applied.

2. In fluid pressure braking apparatus for a vehicle, a plurality of sets of brakes, means for actuating the brakes and comprising a source of pressure, a fluid motor associated with each brake and conduit means for connecting said motors to the source of pressure to permit fluid under equal pressure to be supplied to the motors, and means associated with the conduit means leading to the fluid motors of one set of brakes and operable automatically in response to deceleration of the vehicle for causing the fluid pressure being increasingly applied by the source to said motors to so increase at a different rate than the fluid pressure applied by said source to the motors of another set of brakes that the ratio between said pressures will be a fixed value, said ratio being maintained for every value of fluid pressure applied regardless of the period of time said pressure is being applied.

3. In fluid pressure braking apparatus for a vehicle, a plurality of sets of brakes, means for actuating the brakes and comprising a source of pressure, a fluid motor associated with each brake and conduit means for connecting said motors to the source of pressure to permit fluid under uniform pressure to be supplied to the motors, and means associated with said conduit means leading to one set of brakes for automatically causing the pressure of the fluid in the fluid motors of said set of brakes to be increased at a different rate than the increase in pressure of the fluid in the fluid motors of the other set of brakes when fluid under pressure is supplied from said source and the fluid pressures in the fluid motors of the two sets of brakes to be different for every value of fluid pressure supplied from the source regardless of the period of time said pressure is being supplied, said means comprising a member controlled by the action of gravity and the action of inertia during deceleration of the vehicle.

4. In fluid pressure braking apparatus for a vehicle, a plurality of sets of brakes, means for actuating the brakes and comprising a source of pressure, a fluid motor associated with each brake and conduit means for connecting said motors to the source of pressure, normally open valve means associated with the conduit means leading to the fluid motors of one set of brakes, inertia-controlled means for automatically closing said valve means, and means operable when said valve is closed for causing the pressure of the fluid in the fluid motors of said one set of brakes to be increased at a different rate than the pressure of the fluid in the fluid motors of the other set of brakes when additional pressure is supplied from said source, said means also causing the pressure of the fluid in the fluid motors of said one set of brakes to be different from the pressure of the fluid in the fluid motors of the other set of brakes for every additional pressure supplied from the source regardless of the period of time said additional pressure is supplied.

5. In fluid pressure braking apparatus for a vehicle, a plurality of sets of brakes, means for actuating the brakes and comprising a source of pressure, a fluid motor associated with each brake and conduit means for connecting said motors to the source of pressure to permit fluid under uniform pressure to be supplied to the motors, and means associated with said conduit means leading to one set of brakes for automatically causing the pressure of the fluid in the fluid motors of said set of brakes to be increased at a different rate than the increase in pressure of the fluid in the fluid motors of the other set of brakes when fluid under pressure is supplied from said source, said means comprising valve means controlled by a rolling ball which assumes a valve closed position in response to deceleration of the vehicle.

6. In fluid pressure braking apparatus for a vehicle, a plurality of fluid motors, means for actuating said motors and comprising a source of pressure and conduit means for connecting said motors to the source of pressure to permit fluid under uniform pressure to be supplied to the motors, and means associated with said conduit means leading to one of the fluid motors for automatically causing the pressure of the fluid in said fluid motor to be increased at a different rate than the increase in pressure of the fluid in the other fluid motor when fluid under pressure is supplied from said source, the fluid pressures in said motors always being different when said means is operative regardless of the extent of time any given fluid pressure is being supplied from the source, said means comprising an inertia-controlled valve means for closing said conduit means, and two mechanically connected pistons of different diameters, one of which is acted upon by the fluid pressure from the source and the other of which acts upon the fluid in the said one motor.

7. In fluid pressure braking apparatus for a vehicle, a plurality of sets of brakes, means for actuating the brakes and comprising a source of pressure, a fluid motor associated with each brake and conduit means for connecting said motors to the source of pressure to permit fluid under uniform pressure to be supplied to the motors, means associated with said conduit means leading to one set of brakes for automatically causing the pressure of the fluid in the fluid motors of said set of brakes to be increased at a different rate than the increase in pressure of the fluid in the fluid motors of the other set of brakes when fluid under pressure is supplied from said source, said means comprising two mechanically connected pistons of different diameters, one of which is acted upon by the fluid pressure from the source and the other of which acts upon the fluid in the motors of said set of brakes, means forming a passage for placing the opposite sides of the pistons in communication with each other, and valve means comprising a rolling ball and a track inclined to a horizontal roadway for closing the passage in response to deceleration of the vehicle.

8. In fluid braking apparatus for a vehicle, front and rear brakes, means for actuating the brakes comprising a source of pressure, a fluid motor associated with each brake, conduit means for connecting said motors to the source of pressure to permit fluid under uniform pressure to be supplied to the motors, means associated with said conduit means leading to the rear brakes for automatically causing the pressure of the fluid in the fluid motors of said set of rear brakes to be increased at a different rate than the increase in pressure of the fluid in the fluid motors of the front brakes when fluid under pressure is supplied from said source and the vehicle is decelerating, the fluid pressure in the fluid motors of said rear set of brakes and in the fluid motors of the front set of brakes always being different when said means is operative regardless of the extent of time any given pressure is being supplied from the source, said means comprising two mechanically connected pistons of different diameters, the smaller of which is acted upon by the fluid pressure from the source and the larger of which acts upon the fluid in the motors of said rear brakes, means forming a passage for placing the opposite sides of the pistons in communication with each other, and valve means controlled by the action of inertia when the vehicle is decelerating for closing said passage.

9. In fluid braking apparatus for a vehicle, front and rear brakes, means for actuating the brakes comprising a source of pressure, a fluid motor associated with each brake, conduit means for connecting said motors to the source of pressure to permit fluid under uniform pressure to be supplied to the motors, means associated with said conduit means leading to the front brakes for automatically causing the pressure of the fluid in the fluid motors of said set of front brakes to be increased at a different rate than the increase in pressure of the fluid in the fluid motors of the rear brakes when fluid under pressure is supplied from said source and the vehicle is decelerating, the fluid pressure in the fluid motors of said rear set of brakes and in the fluid motors of the front set of brakes always being different when said means is operative regardless of the extent of time any given pressure is being supplied from the source, said means comprising two mechanically connected pistons of different diameters, the larger of which is acted upon by the fluid pressure from the source and the smaller of which acts upon the fluid in the motors of said front brakes, means forming a passage for placing the opposite sides of the pistons in communication with each other, and valve means controlled by the action of inertia when the vehicle is decelerating for closing said passage.

10. In fluid pressure apparatus for a vehicle, a source of fluid pressure, a fluid motor, a conduit for connecting the source of pressure with the fluid motor, and means associated with the conduit and responsive to deceleration of the vehicle for causing the fluid pressure in the fluid motor to be so increased at a different rate than the fluid pressure supplied by said source that the ratio between said pressures will be constant and said constant ratio will be maintained at all times regardless of the extent of time a given pressure from the source is effective.

11. In fluid pressure apparatus for a vehicle, a source of fluid pressure, a fluid motor, a conduit for connecting the source of pressure with the fluid motor, and means associated with the conduit and responsive to deceleration of the vehicle for causing the fluid pressure in the fluid motor to be so increased at a different rate than the fluid pressure supplied by said source that the ratio between said pressures will be constant and said constant ratio will be maintained at all times regardless of the extent of time a given pressure from the source is effective, said means comprising pistons of different diameters, a by-pass around said pistons, and inertia-controlled means for closing the by-pass and causing the pistons to be operative.

12. In fluid braking apparatus for a vehicle, a fluid conduit, a casing interposed in the conduit and provided with axially aligned cylinders of different diameters, interconnected pistons in said cylinders, means forming a passage through the pistons, a valve seat associated with the passage, a rolling ball for cooperation with said seat, a track for said ball, and means for mounting the casing so that the track is inclined to a horizontal roadway, the inclination of the track being such that the action of gravity maintains the ball off the valve seat and action of inertia during deceleration of the vehicle will move the ball to engage the seat.

13. In fluid braking apparatus for a vehicle, a source of fluid pressure, a fluid motor, a conduit for connecting the source of pressure with the fluid motor, a casing interposed in the conduit and provided with axially aligned cylinders of different diameters, the larger of which is connected to the source of pressure and the smaller of which is connected to the fluid motor, interconnected pistons in said cylinders, means forming a passage through the pistons, a valve seat associated with the passage, a rolling ball for cooperation with said seat and movable off the seat in the direction of the flow of fluid toward the source of pressure, and a track for said ball, said track being so mounted that it is inclined to a horizontal roadway and the inclination of the track being such that the ball is normally off the valve seat but seated when moved by the action of inertia during deceleration of the vehicle.

14. In fluid braking apparatus for a vehicle, a source of fluid pressure, a fluid motor, a conduit for connecting the source of pressure with the fluid motor, a casing interposed in the conduit and provided with axially aligned cylinders of different diameters, the smaller of which is connected to the source of pressure and the larger of which is connected to the fluid motor, interconnected pistons in said cylinders, means forming a passage through the pistons, a valve seat associated with the passage, a rolling ball for cooperation with said seat and moving off the seat in the direction of the flow of fluid toward the source of pressure, and a track for said ball, said track being so mounted that it is inclined to a horizontal roadway and the inclination of the track being such that the ball is normally off the valve seat but seated when moved by the action of inertia during deceleration of the vehicle.

15. In fluid braking apparatus for a vehicle, a source of fluid pressure, a fluid motor, a conduit for connecting the source of pressure with the fluid motor, a casing interposed in the conduit and provided with axially aligned cylinders of different diameters, interconnected pistons in said cylinders, means forming a passage through the pistons, a valve seat associated with the passage, a rolling ball for cooperation with the seat and movable off said seat in the direction of flow of fluid from the motor to the source of pressure, a track for said ball, said track being so mounted that it is inclined to a horizontal roadway and having such an inclination that the ball is normally off the valve seat but seated when moved by the action of inertia during deceleration of the vehicle, and a spring for biasing the pistons to the ends of their cylinders which are adjacent the conduit leading from the source of pressure.

16. In fluid braking apparatus for a vehicle, a source of fluid pressure, a fluid motor, a conduit for connecting the source of pressure with the fluid motor, a casing interposed in the conduit and provided with axially aligned cylinders of different diameters, the larger of which is connected to the source of pressure and the smaller of which is connected to the fluid motor, interconnected pistons in said cylinders, means forming a passage through the pistons, a yieldable annular valve seat associated with one end of the passage and provided with a concave surface of greater area than the cross-sectional area of the opening in the valve seat, a rolling ball for cooperation with the concave surface of the said seat and movable off the seat in the direction of flow of fluid toward the source of pressure, and an inclined track for said ball so positioned that gravity will normally maintain the ball disengaged from the seat and the action of inertia during deceleration of the vehicle will move the ball to engage the seat.

17. In fluid braking apparatus for a vehicle, a source of fluid pressure, a fluid motor, a conduit for connecting the source of pressure with the fluid motor, a casing interposed in the conduit and provided with axially aligned cylinders of different diameters, the larger of which is connected to the source of pressure and the smaller of which is connected to the fluid motor, interconnected pistons in said cylinders, means forming a passage through the pistons, a valve seat associated with the passage, a rolling ball for cooperation with said seat and movable off the seat in the direction of the flow of fluid toward the source of pressure, an inclined track for said ball so positioned that the action of gravity will normally maintain the ball disengaged from the seat, a spring acting on the small piston and normally biasing the large piston into engagement with the end wall of its cylinder, and cooperating means on the end of the large piston and the end surface of the large cylinder for establishing a surface subject to the fluid pressure of the source and of an area equal to the area of the head of the small piston only when the spring is effective to maintain the large piston in engagement with the end surface of its cylinder.

WALTER R. FREEMAN.